United States Patent [19]
Kidder

[11] Patent Number: 5,294,659
[45] Date of Patent: Mar. 15, 1994

[54] METHOD FOR PREPARING EMULSION POLYMERIZED POLYBUTADIENE OF INCREASED PARTICLE SIZE

[75] Inventor: Kevin R. Kidder, Parkersburg, W. Va.

[73] Assignee: General Electric Company, Pittsfield, Mass.

[21] Appl. No.: 454,544

[22] Filed: Dec. 21, 1989

[51] Int. Cl.$^5$ ............................................. C08K 3/20
[52] U.S. Cl. .................................. 524/458; 524/460; 526/201
[58] Field of Search ................ 524/458, 460; 526/201

[56] References Cited

U.S. PATENT DOCUMENTS

| | | |
|---|---|---|
| 3,056,758 | 10/1962 | Howland et al. |
| 3,318,831 | 5/1967 | Gauslaa . |
| 3,330,795 | 7/1967 | Schlüter . |
| 4,226,752 | 10/1980 | Erickson et al. ................ 524/458 |
| 4,385,164 | 5/1983 | Sinclair et al. ................ 526/201 |
| 4,694,035 | 9/1987 | Kasai et al. ................ 526/201 |
| 4,914,142 | 4/1990 | Takarabe et al. ................ 524/458 |

OTHER PUBLICATIONS

Chittenden et al., "High Solids Synthetic Latex Directly from Reactor," *Industrial and Engineering Chemistry*, vol. 40, pp. 337-339 (1948).
Borders et al., "Particle Size in Latex," *Industrial and Engineering Chemistry*, vol. 40, pp. 1473-1477 (1948).
Araki, "Synthesis of a Polydispersed Polybutadiene Latex. Direct Method for High-Solid Polybutadiene Emulsion Preparation", *Polymer Journal*, vol. 19, No. 7, pp. 863-871 (1987).

*Primary Examiner*—Paul R. Michl
*Assistant Examiner*—Edward J. Cain

[57] ABSTRACT

A method for emulsion polymerization of butadiene comprises adding an acrylic latex to the emulsion polymerization medium in an amount effective to increase the average particle size of the resulting polybutadiene latex. The particles of the resulting polybutadiene latex may also exhibit a desirable spherical shape.

10 Claims, No Drawings

METHOD FOR PREPARING EMULSION POLYMERIZED POLYBUTADIENE OF INCREASED PARTICLE SIZE

FIELD OF THE INVENTION

The present invention relates to methods for preparing polybutadiene having an increased average particle size. More particularly, the present invention relates to emulsion polymerization methods for preparing polybutadiene having an increased average particle size.

BACKGROUND OF THE INVENTION

The viscosity of synthetic rubber latex comprising polybutadiene at a given temperature and solids content is largely determined by the average particle size and the distribution of particle size of the polybutadiene. Generally, a large average particle size is desirable and results in a lower viscosity latex at a given solids content and temperature. Various techniques have been employed to increase the particle size of a rubber latex during emulsion polymerization. However, difficulties have been encountered with each of these techniques.

For example, Chittenden et al, *Industrial and Engineering Chemistry*, 40, 337 (1948), and Borders et al, *Industrial and Engineering Chemistry*, 40, 1473 (1948), disclose the use of high organic monomer to water ratios or low soap concentrations to promote agglomeration during emulsion polymerization reactions of butadiene. However, this technique results in one or more periods of instability during which coagulation may occur. Additionally, heat removal may be difficult because of high viscosity conditions and, if the reaction proceeds in an uncontrolled manner during the critical coalescent stage, it is often difficult to reproduce desirable reaction results.

It is also known to add colloidally active compounds to a rubber latex in order to increase the particle size. For example, the Howland et al U.S. Pat. No. 3,056,758 teaches the addition of polyvinylmethyl ether to a synthetic rubber latex in order to increase the particle size while the Schluter U.S. Pat. No. 3,330,795 discloses the addition of a polyalkylene oxide to a synthetic rubber dispersion to cause agglomeration. Attempts have also been made to add colloidally active compounds to the emulsion polymerization recipe. For example, Belgian Patent No. 817,505 discloses the addition of a polyalkylene glycol agglomerating agent while Araki, *Polymer Journal*, Vol. 19, No. 7, 863 (1987) discloses the addition of sodium alganate and magnesium sulfate to the emulsion reaction. However, these methods are disadvantageous in that oftentimes low monomer conversion rates are realized resulting in reactions that may require as long as 70 hours to reach completion.

The Gauslaa U.S. Pat. No. 3,318,831 discloses a method for the production of large particle latices in short reaction times using high-sheer techniques during polymerization. However, this method is disadvantageous in that it requires special reactors capable of high agitation rates.

Thus, a need still exists for improved methods for providing synthetic rubber latices having increased particle size.

SUMMARY OF THE INVENTION

Accordingly, it is an object of the present invention to provide an improved method for preparing synthetic rubber latices of increased particle size. It is a further object of the present invention to provide methods for preparing polybutadiene of increased particle size. An additional object of the invention is to provide emulsion polymerization methods for preparing polybutadiene of increased particle size.

These and additional objects are provided by the present invention which relates to methods for emulsion polymerization of butadiene. According to the present invention, an acrylic latex is added to the emulsion polymerization medium during the polymerization reaction in an amount effective to increase the average particle size of the resulting polybutadiene latex. The present methods are advantageous in that they generally are insensitive to temperature and agitation rates, they do not induce a period of bulk instability during the emulsion polymerization reaction, and the reaction proceeds rapidly once the acrylic latex is introduced. Additionally, the particles of the resulting polybutadiene latex may also exhibit a desirable spherical shape.

These and additional objects and advantages will be more fully understood in view of the following detailed description.

DETAILED DESCRIPTION

The present invention relates to methods for emulsion polymerization of butadiene wherein an acrylic latex is added to the emulsion polymerization medium during the polymerization reaction in an amount effective to increase the average particle size of the resulting polybutadiene latex.

In preparing the synthetic rubber latices of the present invention, one or more butadienes -1,3 may be employed including, for example, butadiene -1,3, 2-methyl-butadiene-1,3 (isoprene), 2,3-dimethyl-butadiene-1,3 and piperylene. Additionally, a mixture of one or more of such butadienes -1,3 with one or more comonomers which are capable of forming rubbery copolymers with butadienes -1,3 may be employed. Preferred comonomers include one or more monoethylenic compounds which contain a $CH_2=C<$ group where at least one of the disconnected valences is attached to an electronegative group, that is, a group which substantially increases the electrical disymmetry or polar character of the molecule. Examples of such compounds which are copolymerizable with butadiene are aryl olefines such as styrene, vinyl toluene, alpha-methylstyrene, chlorostyrene, dichlorostyrene and vinyl naphthalene, with styrene being a preferred comonomer. The comonomer may be included with the butadiene in an amount up to about 50% by weight of the resulting monomer mixture.

As noted above, the acrylic latex is added to an emulsion polymerization medium containing butadiene, and optionally a comonomer, during the polymerization reaction in an amount effective to increase the average particle size of the resulting polybutadiene latex. Preferably, the acrylic latex is added to the emulsion polymerization medium in an amount effective to increase the average particle size of the resulting polybutadiene latex to at least about 200 nm as measured by the turbidity method. Generally, the acrylic latex is added to the emulsion polymerization medium in an amount of at least about 0.1 parts by weight, on a dry basis, per 100 parts by weight of butadiene included in the emulsion polymerization medium. Preferably, the acrylic latex is added in an amount of from about 0.1 to about 10 parts by weight, on a dry basis, and more preferably in an amount of from about 1 to about 5 parts by weight, on a dry basis, per 100 parts by weight of butadiene included in the emulsion polymerization medium.

Generally, the acrylic latex suitable for use in the methods of the present invention may comprise any of the acrylic latices which are well known in the art. In a preferred embodiment, the acrylic latex comprises a polyalkylacrylate latex or a poly(alkylmethacrylate) latex. As demonstrated in the examples set forth below, a particularly preferred acrylic latex which has been employed in the present methods comprises a poly(alkylacrylate-co-methacrylic acid) latex such as poly(butylacrylate-co-methacrylic acid) latex.

The general methods of emulsion polymerization of butadiene are well known in the art. Typically, the emulsion polymerization medium includes a soap or surfactant, a free radical initiator and a chain transfer agent, all of which are well known in the art. Examples of suitable soaps/surfactants include fatty acid soaps and especially water soluble, long chain fatty acid soaps such as sodium or potassium laurate, myristate, palmitate, oleate and stearate. Water soluble sodium or potassium soaps of tall oil and the rosin soaps, including disproportionated rosin soaps, may also be used. If desired, a secondary surfactant may be present, examples of which include alkali metal sulfonates derived from aryl sulfonic acids such as sodium alkyl naphthalene sulfonate. Suitable free radical initiators include organic hydroperoxides and ionizable heavy metal salts. Suitable chain transfer agents include the well known mercaptan-type compounds.

To one of ordinary skill in the art, it would appear that addition of an acrylic latex at the beginning or during the emulsion polymerization reaction would provide similar results as are encountered with the addition of colloidally active agents employed in the prior art, namely particles begin to agglomerate shortly after forming, whereby the number of particles is reduced early in the reaction thereby resulting in very long reaction times. However, the present inventor has discovered that in fact, synthetic rubber latex particles of an increased size can be formed according to the present methods without requiring long reaction times. While the present invention is not intended to be limited by the following, it is the inventor's belief that a majority of the monomer is polymerized in small particles which takes advantage of the high particle number kinetics, and the reaction is then completed after the particles have been agglomerated, thereby resulting in large size particles in reduced reaction times. Additionally, the monomer-swollen particles appear to be softer and more deformable during the agglomeration whereby complete coalescence may be obtained. Coalescence of the particles, coupled with the natural tendency toward formation of spherical particles during the completion of the polymerization, may result in the particles having a desirable spherical shape.

The present methods are advantageous in that the acrylic latex induced agglomeration is generally insensitive to temperature and agitation rate, the method does not induce a period of bulk instability in the emulsion polymerization process, and the polymerization reaction occurs very rapidly once the acrylic latex is introduced. Additionally, it appears that small particles introduced after the acrylic latex is added are also agglomerated. The agglomeration of these new particles by the acrylic latex may lead to a narrower particle size distribution than is produced by other polymerization/agglomeration methods. The reduction of total surface area when the particles agglomerate may result in the release of soap which normally leads to a new generation of small particles unless the reaction conditions prevent such.

The following examples serve to illustrate specific embodiments of the invention.

EXAMPLE 1

A twelve-ounce citrate bottle was charged with 100 parts by weight butadiene, 3.5 parts by weight potassium oleate, 0.356 parts by weight tetrasodium pyrophosphate, 0.14 parts by weight potassium peroxysulfate, 0.2 parts by weight tert-dodecyl mercaptan and 230 parts by weight demineralized water, and then fitted with a rubber septum. The medium was heated at 49° C. for seven hours to commence polymerization. The temperature was then raised to 65° C. and 2.0 parts by weight (dry basis) of an acrylic latex agglomerating agent was added. The acrylic latex comprised a 20/80 methacrylic acid/butyl acrylate copolymer. The resulting polybutadiene latex had a particle size of 330 nm as measured by the turbidity method.

EXAMPLE 2

A pressure reactor was charged with 100 parts by weight butadiene, 3.5 parts by weight potassium oleate, 0.356 parts by weight tetrasodium pyrophosphate, 0.2 parts by weight tert-dodecyl mercaptan and 220 parts by weight demineralized water. The mixture was heated to 140° F. with agitation. The polymerization reaction was then initiated by adding 0.14 parts by weight of potassium peroxysulfate dissolved in 10.0 parts by weight demineralized water in a shot manner. At 65% conversion to polymer, the temperature was raised to 155° F. At 80% conversion to polymer, the agitation was raised to promote rapid mixing and 3.0 parts by weight (dry basis) of the acrylic latex agglomerating agent described in Example 1 was added in a shot manner. After one minute, the agitation rate was returned to normal. The reaction was continued and run to 91.5% conversion in 17 hours, resulting in a latex having less than 0.2% coagulum, an average particle diameter of 290 nm as measured by the turbidity method, and the following particle-size fractions, by weight: 2.85%<100 nm, 34.5%<250 nm, and 99.02%<400 nm in diameter. The resulting polybutadiene was sufficiently stable to be grafted with styrene and acrylonitrile and was useful as an impact modifier in various thermoplastics.

EXAMPLE 3

In this example, polybutadiene was prepared in a manner similar to that employed in Example 2 except that in place of the 3.0 parts by weight (dry basis) of the acrylic latex agglomerating agent employed in Example 2, 5.0 parts by weight (dry basis) of the acrylic latex agglomerating agent was used in this example. The reaction ran to 91.0% conversion in 17 hours and provided a latex with an average particle diameter of 245 nm as measured by the turbidity method and containing less than 0.01% coagulum. This latex was also stable to grafting with styrene and acrylonitrile.

The preceding examples are set forth to illustrate specific embodiments of the invention and are not intended to limit the scope of the methods and products of the present invention. Additional embodiments and advantages within the scope of the claimed invention will be apparent to one of ordinary skill in the art.

What is claimed is:

1. A method for emulsion polymerization of butadiene in an emulsion polymerization medium, comprising providing an emulsion polymerization medium containing monomer consisting essentially of butadiene and up to about 50% by weight of an aryl olefin comonomer, and a soap, and adding an acrylic latex to the emulsion polymerization medium during the polymerization reaction in an amount of from about 0.1 to about 10 parts by weight, on a dry basis, per 100 parts by weight of butadiene included in the emulsion polymerization medium.

2. A method as defined by claim 1, wherein the acrylic latex is added to the emulsion polymerization medium in an amount effective to increase the average particle size of the resulting polybutadiene latex to at least about 200 nm as measured by the turbidity method.

3. A method as defined by claim 1, wherein the acrylic latex is added to the emulsion polymerization medium in an amount from about 1 to about 5 parts by weight, on a dry basis, per 100 parts by weight of butadiene included in the emulsion polymerization medium.

4. A method as defined by claim 1, wherein the acrylic latex comprises a polyalkylacrylate latex.

5. A method as defined by claim 1, wherein the acrylic latex comprises a poly(alkylmethacrylate) latex.

6. A method as defined by claim 1, wherein the acrylic latex comprises a poly(alkylacrylate-co-methacrylic acid) latex.

7. A method as defined by claim 6, wherein the acrylic latex comprises poly(butylacrylate-co-methacrylic acid) latex.

8. A method as defined by claim 1, wherein the emulsion polymerization medium further comprises a free radical initiator and a chain transfer agent.

9. A method as defined by claim 1, wherein the emulsion polymerization medium comprises the comonomer.

10. A method as defined by claim 9, wherein the comonomer comprises styrene.

* * * * *